United States Patent
Angheloiu et al.

(10) Patent No.: US 11,288,749 B2
(45) Date of Patent: Mar. 29, 2022

(54) INTERACTIVE ALGORITHM FOR DETERMINING NEGOTIATED HEALTHCARE PRICE RATES

(71) Applicants: George O. Angheloiu, Dubois, PA (US); Nicoleta A. Angheloiu, Dubois, PA (US); Narayana Subramany, Ridgway, PA (US); Viorel Angheloiu, Vancouver, WA (US); Ovidiu Haiduc, Woodridge, IL (US)

(72) Inventors: George O. Angheloiu, Dubois, PA (US); Nicoleta A. Angheloiu, Dubois, PA (US); Narayana Subramany, Ridgway, PA (US); Viorel Angheloiu, Vancouver, WA (US); Ovidiu Haiduc, Woodridge, IL (US)

(73) Assignee: George O. Angheloiu, Lancaster, PA (US)

( * ) Notice: Subject to any disclaimer, the term of this patent is extended or adjusted under 35 U.S.C. 154(b) by 1506 days.

(21) Appl. No.: 14/634,166

(22) Filed: Feb. 27, 2015

(65) Prior Publication Data
US 2015/0248729 A1   Sep. 3, 2015

Related U.S. Application Data

(60) Provisional application No. 61/946,134, filed on Feb. 28, 2014.

(51) Int. Cl.
*G06Q 40/08* (2012.01)
*G06Q 10/10* (2012.01)

(52) U.S. Cl.
CPC ............ *G06Q 40/08* (2013.01); *G06Q 10/10* (2013.01)

(58) Field of Classification Search
CPC .............................. G06Q 40/08; G06Q 10/10
(Continued)

(56) References Cited

U.S. PATENT DOCUMENTS

| | | | | |
|---|---|---|---|---|
| 2002/0065758 | A1* | 5/2002 | Henley | G06Q 40/08 705/37 |
| 2007/0276695 | A1* | 11/2007 | Lieberman | G06Q 30/00 705/2 |
| 2014/0142973 | A1* | 5/2014 | Henley | G06Q 30/08 705/2 |

FOREIGN PATENT DOCUMENTS

WO    WO-2007103714 A3 *  1/2009 ............. G16H 20/10

OTHER PUBLICATIONS

Kaplan et al.: "The Big Idea: How to Solve The Cost Crisis in Health Care", Sep. 2011, Harvard Business Review, pp. 1-28 (Year: 2011).*

(Continued)

*Primary Examiner* — Joy Chng

(57) ABSTRACT

The present invention describes a system of automatic interaction between three groups of participants: a multitude of health care provider units, pharmacies or pharmaceutical or medical device manufacturers, a central organization system and a multitude of potential health care users or payers such as potential patients or groups of patients, employers or insurance companies. The purpose of the automatic interaction executed by the central organization system is to determine the best or lowest acceptable negotiated price for healthcare services or medications/devices by interested parties such as individual patients or groups of patients, employers or health insurance companies and resulting into a contract that will apply over a comprehensive all-inclusive list of health services or medications or devices, and that will result into health services rendered or medications or devices being sold from the all inclusive (Continued)

comprehensive list of services, medications or devices at any time during the time period indicated in contract.

12 Claims, 7 Drawing Sheets

(58) Field of Classification Search
USPC .......................................................... 705/2–3
See application file for complete search history.

(56) References Cited

OTHER PUBLICATIONS

Kaplan et al.: "The Big Idea: How to Solve The Cost Crisis in Health Care", Harvard Business Review, Sep. 2011, pp. 1-28 (Year: 2011).*

Moseley: The U.S. Health Care Non-System, 1908-2008, Virtual Mentor, 2008;10(5):324-331. doi: 10.1001/virtualmentor.2008.10.5.mhst1-0805. (Year: 2008).*

* cited by examiner

ADD ITEMS FOR PRICE NEGOTIATION:

Select Items....

[Add Item in Provider's Database]

| No. | Items | Min Age | Max Age | Min Income | Max Income | Standard Price | Single Discount | Package Discount | Multiple providers discount | |
|-----|-------|---------|---------|------------|------------|----------------|-----------------|------------------|-----------------------------|---|
| 1 | Colonoscopy | 50 | 76 | 0 $/year | 48000 $/year | 300 $ | 80 % | 85 % | 75 % | Delete |
| 2 | Urgent Cholecystectomy | 0 | 0 | 0 $/year | 0 $/year | 0 | 0 % | 0 % | 0 % | Delete |

List of results:

| No. | Items | Min Age | Max Age | Min Income | Max Income | Standard price | Single Discount | Package Discount | Multiple providers discount |
|-----|-------|---------|---------|------------|------------|----------------|-----------------|------------------|-----------------------------|
| 1 | Colonoscopy | 50 | 76 | 0 $/year | 48000 $/year | 300 $ | 80 % / -240 $ | 85 % / -255 $ | 75 % / -225 $ |
| 2 | Urgent Cholecystectomy | 0 | 0 | 0 $/year | 0 $/year | 0 $ | 0 % / -0 $ | 0 % / -0 $ | 0 % / -0 $ |

Negotiation process: how, why

This a trial site. healthus.us and the associated medical comprehensive negotiation system are protected by the provisional USPTO patent application  
☐ INTERACTIVE ALGORITHM FOR DETERMINING NEGOTIATED HEALTHCARE PRICE RATESO, 61946134/2014.

INTERACTIVE ALGORITHM FOR DETERMINING NEGOTIATED HEALTHCARE PRICE RATES

CROSS-REFERENCE TO RELATED APPLICATIONS

This patent application claims the benefit of U.S. Provisional Patent Application No. 61/946,134, filed Feb. 28, 2014, which is incorporated by reference.

BACKGROUND OF THE INVENTION

Charges for health care services have been increasing dramatically in the past two decades, much faster than predicted by the average inflation rate. In addition to an aging population and advanced and more expensive services potentially being delivered, an interplay between the hospitals' charge and insurance companies' negotiated reimbursement systems have possibly contributed as well to this price evolution.

There several inventions to date known to have as objective the negotiation or prediction of medical prices. In the first instance U.S. Pat. No. 8,095,384 by Firminger et al., projects finding the best communication between a patient with a specific medical problem and the best provider, finding the best suited provider at the best cost and finding the best medical algorithm to treat that particular problem. This approach lacks the ability to predict what particular specific acute problem might arise in the near or far future, in order for the potential patients to plan for it and price-negotiate it in advance. Hence acute care such as hospitalizations, surgeries, acute medical treatments, emergency visits, and other less semi-acute, semi-elective operations and medical visits or treatments will be possibly not included in a one-at-a-time algorithm, exposing the potential patient to possible high medical costs.

Another invention by Henley et al., U.S. Pat. No. 7,657,479 B2, advises a similar algorithm where one or more providers offer in an auction system one or more services, from which individual patients can select and negotiate in an auction system a purchasing price. The service selling and buying process however is not exhaustive and refers only to buying only one medical care item with no long-time future contract, leaving in this way a particular patient exposed to eventual high medical costs for acute care in the future.

In a rather similar invention, by George Smith, "A system and a method for purchasing healthcare products", the inventor teaches a method of selling healthcare products packages based on a voucher method, linked to various electronic devices, that lends to a negotiated system. No details are put forward regarding the criteria that lead to a negotiated price. At the same time the method targets only individual healthcare products or packages that need consumed at an individual point in time, leaving the potential patient vulnerable to unforeseeable high costs in the future.

Yet another application by Lieberman Ser. No. 11/420,678 (United States Patent Application 20070276695), as well as Eaton et al. (WO2006069065) teach a method of price variation by a healthcare provider depending on the need of his/her services on the local medical market place. There is no interaction or feedback from the interested potential patients or payers, and hence no real negotiation process is actually entertained; at the same time the provider cannot receive an accurate approximation of the present or future healthcare need in the local market in order to closely gauge the negotiated price.

Two other inventions, U.S. Pat. No. 8,498,885, by Vanderzee et al., and US patent application 20120232936 by Dena Bravata provide cost prediction for health care services of interest, with a final purpose of predicting out-of-pocket costs for health care services or offering reference prices for third-party payers. It does not allow direct negotiation of prices that would eventually allow receiving health services later on at the negotiated rate.

BRIEF SUMMARY OF THE INVENTION

In order to reestablish the individual patient's ability to better negotiate all out-of-pocket and other prices for all health care services and medications/devices for a period of time in the future or immediate past, we propose an algorithm that would insure such a negotiation process between health care providers and pharmacies/pharmaceutical or medical device manufacturers on one side and individual patients or groups of patients on the opposite side, resulting into a contract and then eventual application of the contract agreement with every occasion the potential patients will need services or medications or medical devices that constitute the object of the particular negotiation. By health care providers is understood any of the following: hospitals, solo or multi-physician practices either private or owned by other medical organizations, laboratories, offices of rehabilitation or physical therapy, nursing homes, offices of dental care, companies selling durable medical equipment and other health care providers that perform medical tests, procedures, medical visits and consults.

This particular system will allow access of potential patients at any time in a comprehensive exhaustive manner to negotiated prices of all possible categories of medical services, medications and devices, without the need to target a specific physician, period of time, or certain type of service, medication or device. This is an important feature for two reasons. First of all health or sickness are aleatory phenomena, which for the most part are difficult to predict. Hence the time to use a negotiated service, medication or device is hard to decide. Second the type of service, medication or device needed or provider needed will be similarity difficult to choose in absence of a magic mirror that will predict the medical event possible to happen in the future. This type of assured negotiated rate will grant access to all categories of health care in a timely manner and for an acceptable price at any time or in any circumstance without the need of picking the correct time, category, provider or source of medication or device.

Interested negotiating parties. Potential patients interested in such a negotiation process are potential patients with no insurance, potential patients with partial insurance covering only a certain number of tests, procedures, consults or medical visits, potential patients with high insurance deductible or high co-pays, potential patients in search or in need of medical services in an area outside of geographical area of insurance coverage, potential patients with no or only partial local medical insurance traveling from abroad, and patients with denied insurance claims. Other parties that might be interested in negotiating health care services, medications or devices prices are any company and in addition also health insurance organizations on behalf of their employees and members respectively.

Interested health care providers or manufacturers and pharmacies. Interested health care providers or pharmacies and pharmaceutical or medical device manufacturers are those in need to increase their client basis by offering negotiated prices of the services or manufactured/sold goods.

The objective of this algorithm is the negotiation of health care/pharmaceutical prices to levels lower that the initial tag price posted by health care providers or pharmacies and pharmaceutical or medical device manufacturers for health care services or medications/devices respectively.

Figure 2:
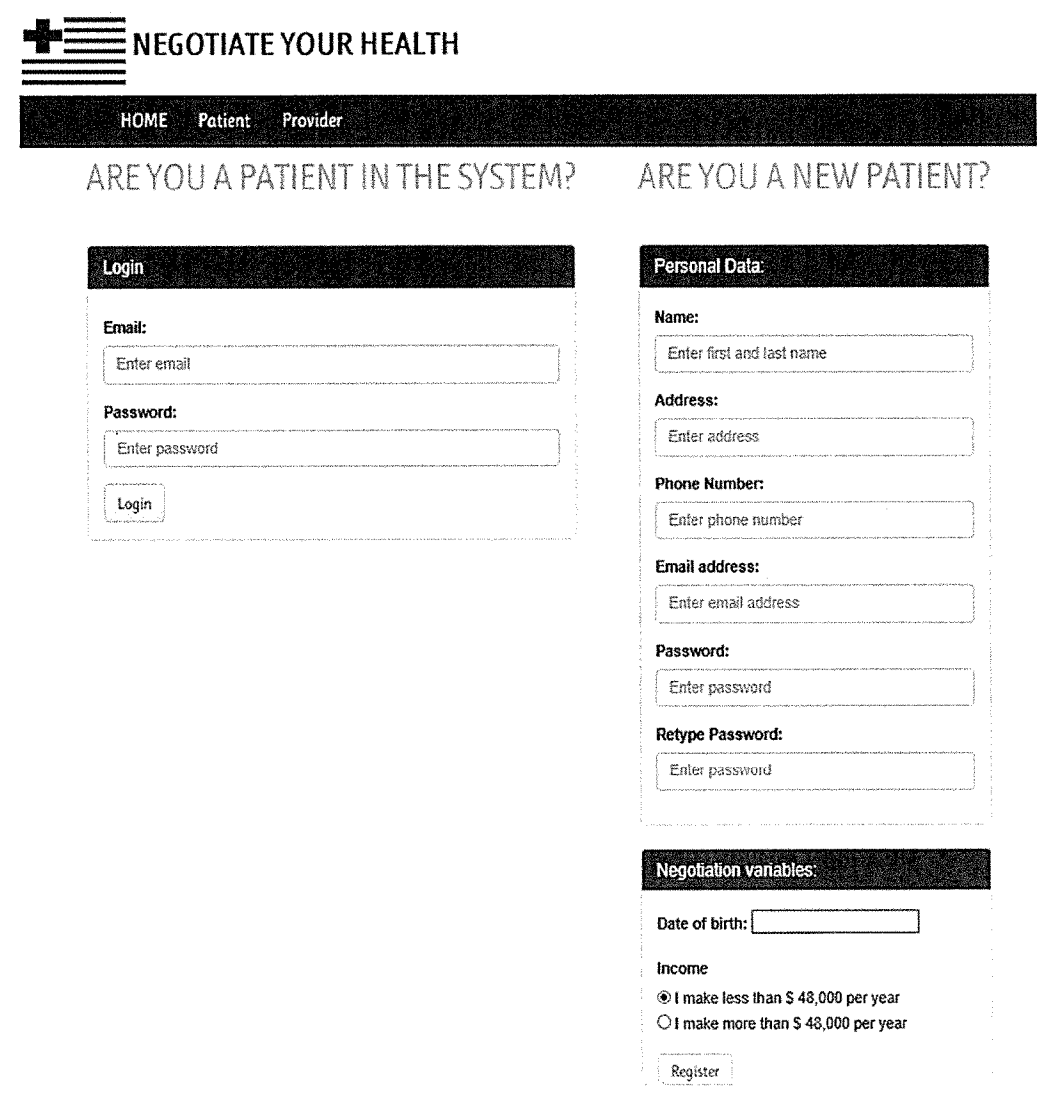

1—Feeds provided by heath care providers or medical sources into the central organization 2—Feeds provided by patients or other health care payers into the central organization 3—Patients or other health care payers 4—Process of negotiating health care services' or products' prices between heath care providers or medical sources and patients or other health care payers 5—Patients or other health care payers establish contracts with health care providers or medical sources as a result of the negotiating process FIG. 2. depicts a website page where the patient will register and initiate the algorithm.

Figure 3:
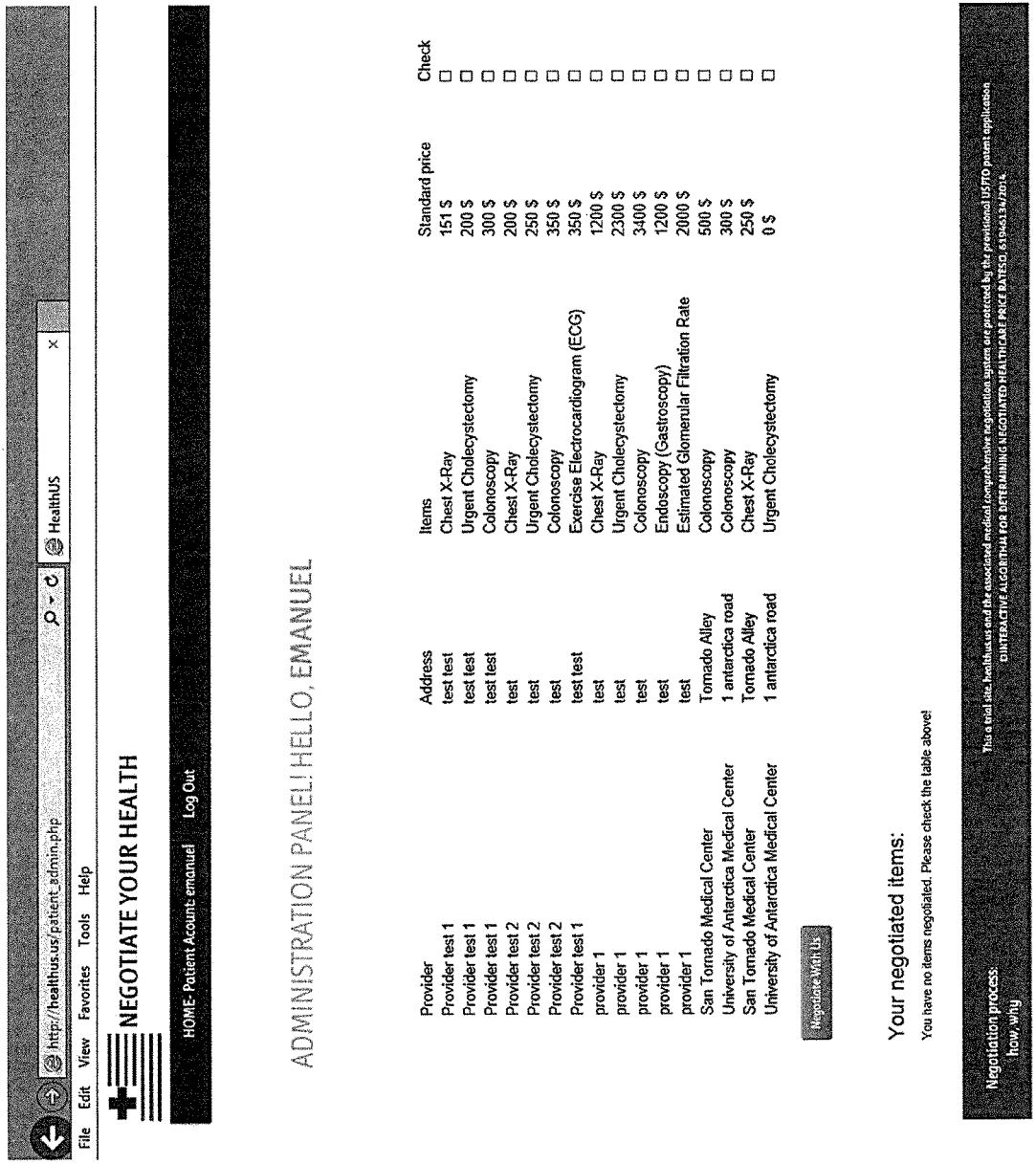

FIG. 3. depicts a website page where the patient will select categories and providers.

Figure 4:
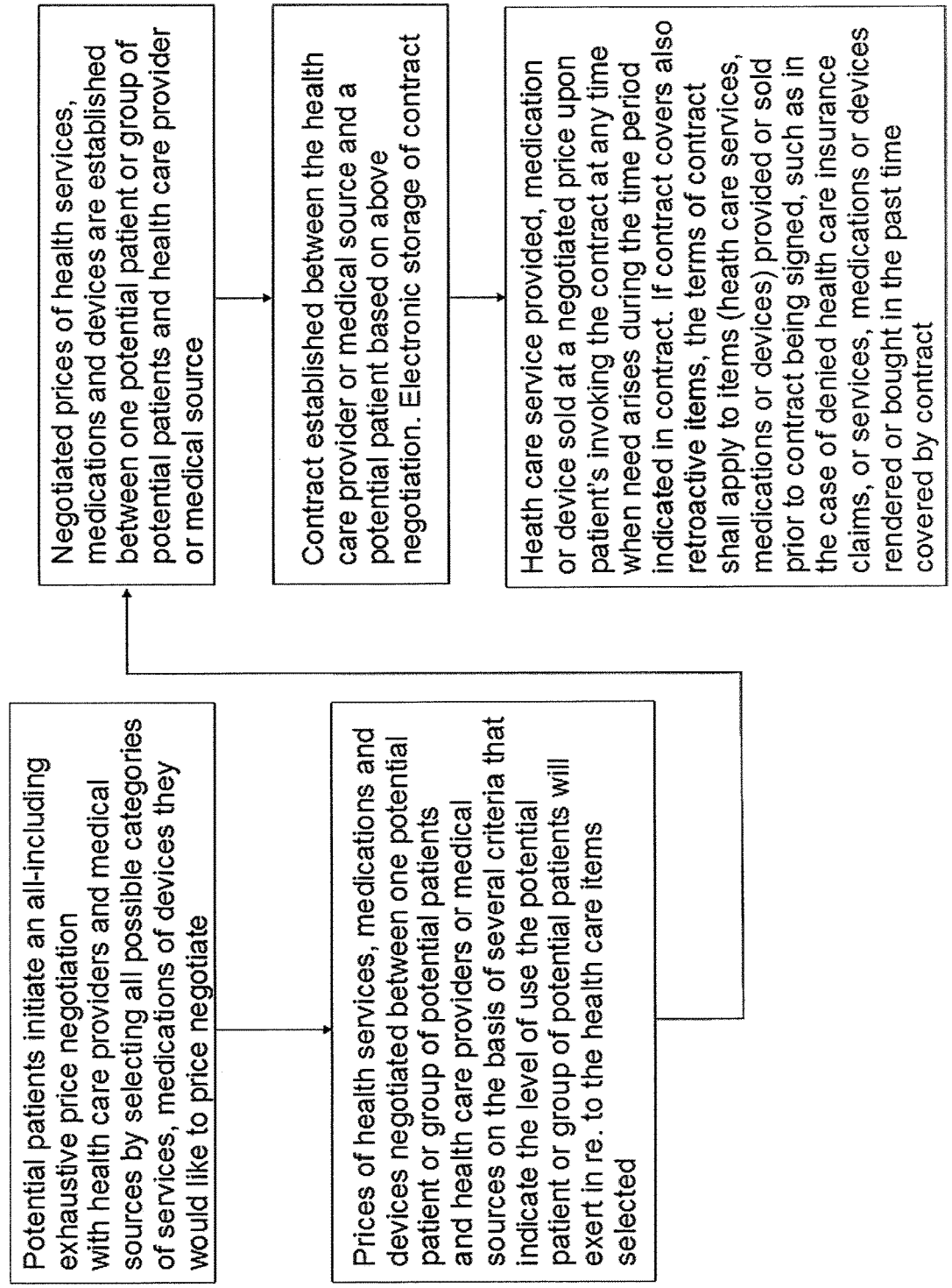

FIG. 4 depicts an information processing flow-diagram from starting of negotiation to generation of electronic contract between a provider and a potential patient, an employer or insurance company, electronic storage of contract, and potential use in the use period specified in the contract.

Figure 5:
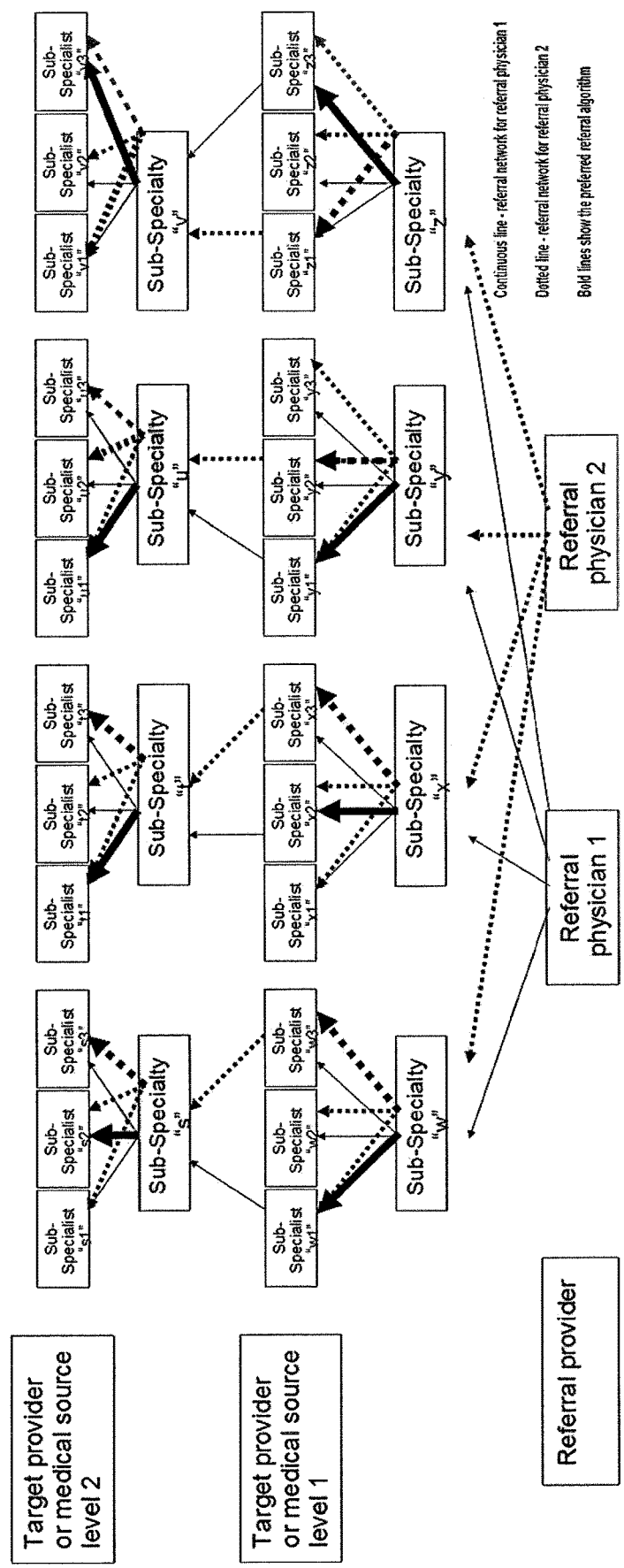

FIG. 5 depicts a preferred referral algorithm tree of two exemplary primary care providers.

FIG. 6 depicts a website page where the provider or medical source can lower the price to a negotiated price or offer a price discount using criteria that a potential patient or group of patients may access in the future.

Figure 7:
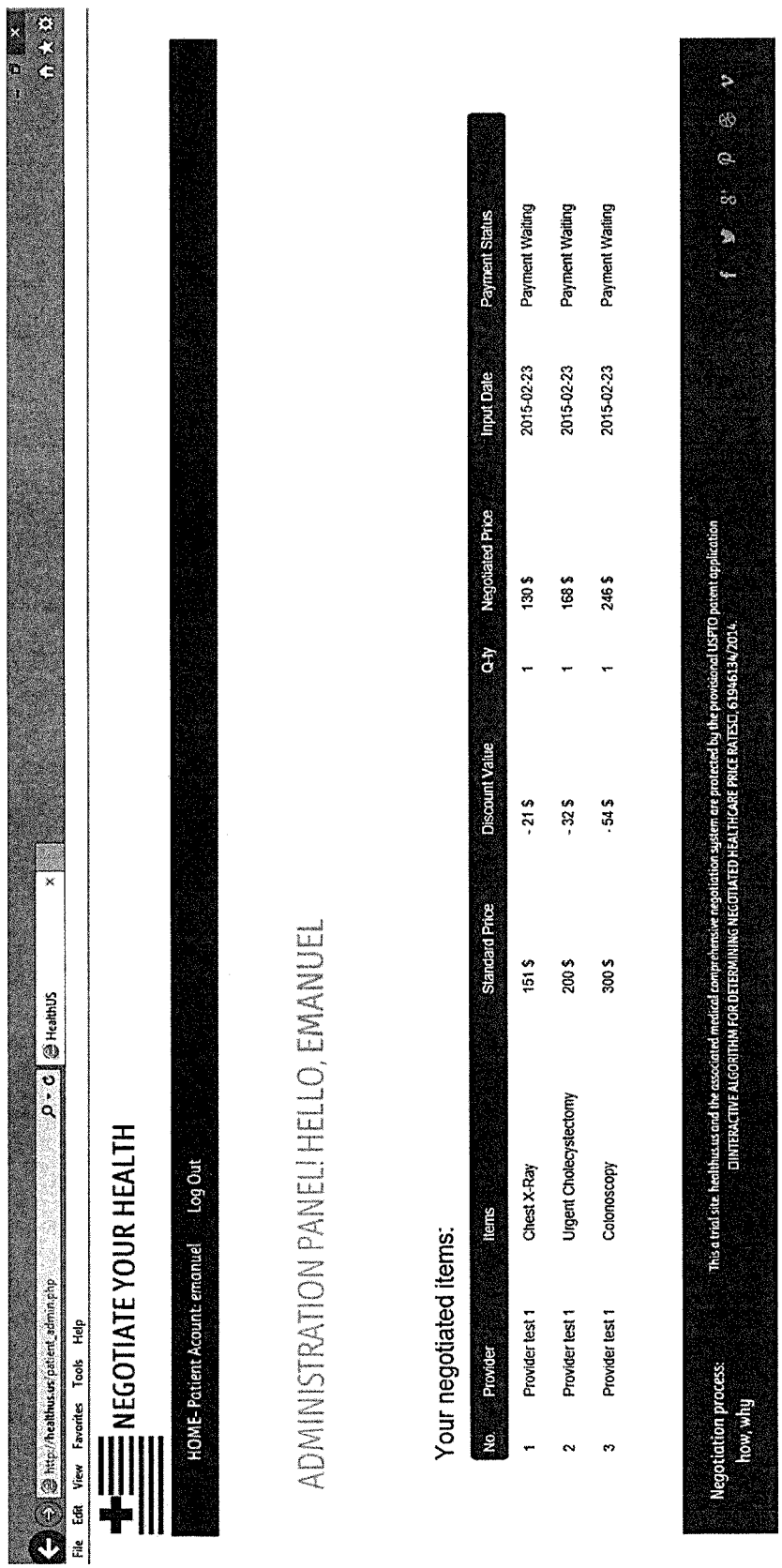

FIG. 7 depicts a website page showing the negotiated prices for items negotiated by a patient called in this example "Emanuel", as the last step in the negotiation algorithm.

DETAILED DESCRIPTION OF THE INVENTION

Figure 1:
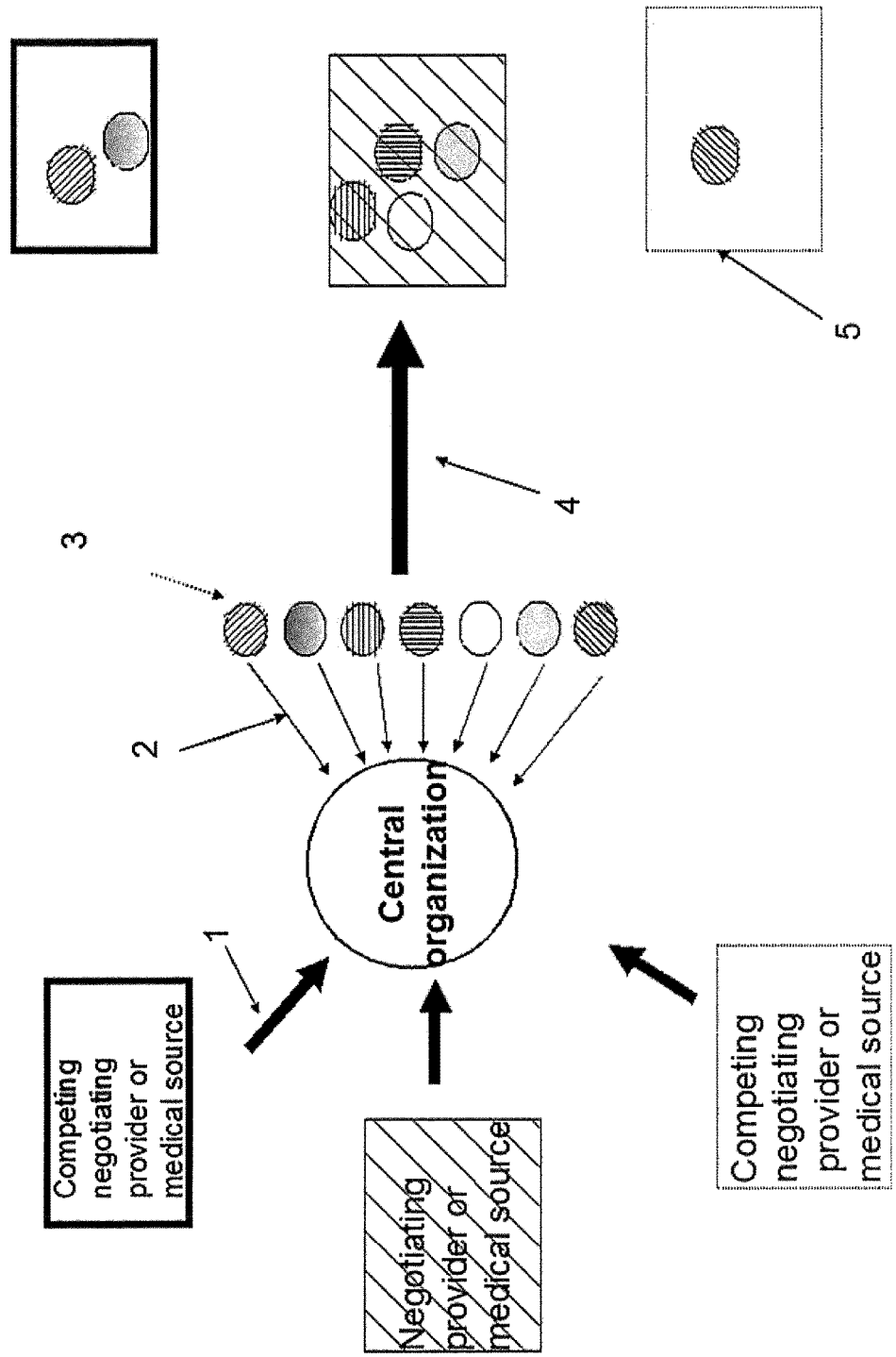
FIG. 1. depicts a feed system between a negotiating central organization, health care providers or pharmacies/pharmaceutical or medical device manufacturers and potential health care users, employers or insurance companies.

Medical payers or representatives of patients' groups on one side and health care providers or medical sources (medical sources defined by the collective group of pharmacies, pharmaceutical manufacturers or retailers and medical device retailers or manufacturers) will provide feeds into the database of a central organization, that will determine based on the feeds illustrated in FIG. 1, the discounts that will apply to various categories of health care services or medications/devices that represent the object of negotiation. The negotiated prices thought this application will be expressed either in terms of fraction discounts or as absolute negotiated prices. The fraction discounts (or simply labeled "discounts") are defined by the percentage ratio of [difference between the initial (or "tag" or "standard") price rate and the negotiated price rate] and [initial ("tag" or "standard") price rate].

The negotiation process is facilitated by a central organization (FIG. 1). FIG. 1 illustrates an interactive automatic algorithm between interested health care providers or medical sources 5 and potential patients with a negotiating central organization for determining reasonable negotiated out-of-pocket prices. The central organization establishes an initial algorithm approved by the medical source or health care provider that is stored and used subsequently by the two parties for conducting the price negotiation in an automatic manner, receives feeds 1, 2 between a first party (healthcare providers or medical sources) and a second party 3 (potential patients or health care payers such companies or health insurance companies) and eventually facilitates the negotiation communication between the two parties, with potential patients matching 4 with providers on the most acceptable price 5, establishes a contract between the two parties that includes the initial tag prices and the negotiated prices, collects a commission as a percent margin of the difference between the initial tag price and the negotiated price as a reward for the negotiation process, stores all data regarding the negotiation process, such as initial tag price and negotiated price and contract resulting from the negotiating process, transmits the results of the negotiation process to the first and second negotiating parties or uses the data resulting from the negotiating process for offering to the potential patient or payer a real-time negotiated price at a time (such as in the future or for use in regards to services delivered or medications and devices bought in a past time) when the potential patient or payer benefits from medical services or buys medical devices or medications from the health care provider or medical source.

Here is the algorithm for negotiating out-of-pocket and other types of prices for health care services offered by healthcare providers:

1. The health care providers will offer to patients services broken down in categories such as but not limited to: consultations, medical visits, laboratory tests, procedures, emergency room visits, hospital admissions, rehabilitation or physical therapy visits, nursing home admissions, and others. All these categories will be subdivided into specialties, such as but not limited to: internal medicine and sub-specialties, such as cardiology (heart care), gastroenterology (care of the gut and abdominal organs), endocrinology, adolescent medicine, allergy and immunology, geriatrics (care of the elderly), hematology (blood medicine), infectious disease, nephrology (kidney medicine), oncology (cancer care), pulmonology (lung medicine), rheumatology (arthritis medicine), sports medicine, genetics and molecular biology services, psychiatry, neurology; anesthesiology; radiology; interventional radiology; radiation oncology; medical physics; nuclear medicine; pathology; physical medicine and rehabilitation; aerospace medicine; occupational medicine; public health and general preventive medicine; pediatrics and subspecialties such as adolescent medicine, child abuse pediatrics, developmental-behavioral pediatrics, hospice and palliative medicine, medical toxicology, neonatal-perinatal medicine, neurodevelopmental disabilities, pediatric cardiology, pediatric critical care medicine, pediatric emergency medicine, pediatric endocrinology, pediatric gastroenterology, pediatric hematology-oncology, pediatric infectious diseases, pediatric nephrology, pediatric pulmonology, pediatric rheumatology, pediatric transplant hepatology, sleep medicine, sports medicines; adult hospice and palliative medicine; adult sleep medicine; surgery and surgical specialties such as general surgery, colon and rectal surgery, neurological surgery, obstetrics and gynecology, ophthalmology (eye surgery), orthopaedic surgery (bone, joint and ligament surgery), otolaryngology (ear, nose and throat), plastic surgery, vascular surgery, cardiac and thoracic surgery, urology, or other specialties. Initial price tags (defined as the non-negotiated price that the provider bills to a medical payer) are to be taken from the health care provider's roster and will be attached to each health care item listed—

2. A price reduction algorithm will be initiated by an individual patient or assigned representative applying for himself or for a group of patients respectively, or by any type of medical payer. FIG. 2 illustrates a website page where the patient will register and initiate the algorithm.

3. The potential patient or medical payer will select the health care providers he would like to negotiate with, the categories of healthcare services he is interested in for each provider and eventually sub-specialties he is interested in for all these categories. FIG. 3 illustrates a website page where the patient will select categories and providers. Same steps are represented in a flow diagram in FIG. 4.

4. The patient or the representative of the group of patients he/she negotiates for or any other medical payer or other medical payers will select certain criteria that will generate a individual discount (expressed in percentages, or fractions, or as an absolute negotiated price) corresponding to the criterion selected. Several criteria are: age, gender, comorbidities, income, number of potential patients in the group that the patient belongs to, number of regularly (annually or at several years interval) provided healthcare items that the patient negotiates to pay in advance, productivity of items picked by the potential patient (equal to the cash profit that the particular item will bring to the negotiating provider), the number of hospitals the potential patient chooses to negotiate in the geographical area of interest, number of categories of items that the patient selects for the particular provider. FIG. 2 illustrates a website page where the patient will initially introduce the negotiation criteria (in this case age or date of birth and income). Since this system is an exhaustive algorithm that includes all possible categories of healthcare items that providers in the particular geographical region offer, the potential patient or medical payer will have the option to select all categories with the same provider or split them between various providers depending on various factors, such as availability of certain categories with particular providers, quality of care and geographical location of various providers. The more numerous productive categories the potential patient will select with same provider, the lower the cost will be per item selected. Hence the possibility of selecting from a large exhaustive list of categories of health care services should weigh in significantly in the final price negotiated per each category of items or per each item selected.

Patient negotiating criteria. Here are several examples that indicate how feeds from patients can affect the negotiated health care price:

a. Demographics:
   age. The higher the age the lower the price per admission/test/consult/procedure (there will be more use for older patients). Also children/infants will have lower prices (higher discounts) because they need more care.
   female gender could be inducive of lower negotiated costs/higher discounts since women may use more health care services than men.
   income. the lower the income (there will be more patients in this category) the lower the negotiated price per health care item, medications or medical devices.

b. Comorbidities: the higher the number of comorbidities the lower will be the negotiated price or higher discount per admission/test/consult/procedure.

c. If patient is part of a group negotiating, the larger the group size the lower will be the price per item negotiated.

d. During negotiation, individuals can attach to larger groups and get immediately a better price range, while adding to the negotiation power of the group they attach to.

e. Patients can schedule and pay in advance at negotiated prices for regular necessary items (annual physical, CBC, CMP, TSH, PSA, Pap smear, CxR, EKG; colonoscopy every 10 years). The higher will be the number of scheduled and paid in advance tests/visits the lower will be the price of all negotiated items or higher the discount.

f. The higher the number and productivity of categories and sub-specialties picked the lower will be the price of all negotiated items or higher the discount.

g. The lower the number of health care providers and medical sources hat the patient will negotiate items with, the lower the price will be for all negotiated items h. The higher the number of categories and sub-specialties the potential patient will negotiate with an index health care provider or medical source, and the lower the number of categories and sub-specialties that same potential patient will negotiate with other health care providers or medical sources, the lower will be the price rate negotiated with the index health care provider or medical source.

i. The type of categories the patient will negotiate with the other providers: the more productive the categories and sub-specialties that the patient will pick the lower will be the negotiated price of all negotiated items.

j. The geographical area where the provider is located. The farther from home or work the lower the price will be per negotiated item.

k. The duration of time the agreement is signed for. The longer the duration of agreement the lower will be the price per negotiated item.

l. Whether the patient chooses to lock the price or not for the duration of the agreement. Locking the price for an item will cause an increase in the negotiated price or decrease in discount.

Healthcare is unique by being a time-dependent matter, mostly in acute cases (such as medical acute conditions—for ex. acute myocardial infarction, diabetic ketoacydosis and others; or acute surgical cases—for ex. acute appendicitis, intestinal perforation or occlusion and many others) or semi-elective (for ex. impacted gallbladder stones, urinary tract infection, colon cancer and others). Not only the medical acute or semi-acute aspect of this type of care urges a close geographical proximity of the patient to the point of care, but also the integrity of a close network between the potential patient and his social peers (such as family, caretakers or close friends) needs such a close location. Hence the geographical proximity to the health care center that potential patients may negotiate with is an important criterion for negotiating the out-of-pocket price. A last important criterion is the length of time that the potential patient selects to become a potential patient for a particular provider and if he or she selects to lock his/her choices for the duration of this time period.

The power of each of these criteria are additive to each other and result into a "criteria discount", although at times the sum of all individual discounts don't have necessarily to be equal to the "final added discount" (expressed in percentages, or fractions), but have to be lower than 100% and higher than each of the particular individual discount. For example if age greater than 60 will bring a 20% discount, income below 200% federal poverty limit 15%, while being a woman a 15% discount, the final added discount value for a 60 year old woman with an income below 200% federal poverty level can be 50% or any value lower than this percentage but higher than each of the particular individual discount.

In a different type of discount algorithm, the patient or the medical payer can benefit from a "preferred referral network" (PRN), in case this is endorsed by the health care provider that acts as a referring agent for this particular patient. A PRN could be initiated usually by a primary care physician or specialist or allied healthcare provider that acts as a referring physician, and negotiates with a specialist or sub-specialist (referral target provider) to which he/she refers patients to, an agreement that the patients will benefit from discounted rates while seeing the target referral provider if the referring physician/provider will refer all his/her patients only to him, or possibly only to him and not more than two, three or any other limited number of physicians or providers (FIG. 5). Depending on how large the latter target referral group is (1, 2, 3 and so on number of physicians) the target physician may accept a larger or lower discount. Hence the negotiation criterion in this case is the number "n" of referral target providers to whom an index referring provider refers to in a certain specialty of sub-specialty. In this way all patients coming from the referring physician(s) will be incentivized to use these particular target physicians, no matter if they pay out-of-pocket or they are insured, since the particular insurance company will prefer a discounted rate as well, the latter reflecting into a lower premium. The referring physician will be interested to pursue such a strategy since said strategy will attract more patients to him, said patients knowing that the referring physician referral pattern includes lower fees from his target physicians/providers.

One can imagine a referral tree network, that ramificates from the roots (primary care physicians) to the branches that represent various types of specialists. In this way, not only that potential patients benefit from discounted out-of-pocket rates or lower insurance premiums, but they also can identify in advance who are the potential specialists or sub-specialists that they can reach if they sign up or consult with a certain physician that will later on act as a referring physician. FIG. 5 depicts a PRN, starting from the level of referral health care providers, and ramificating to two levels or more of health care sub-specialists or medical sources.

Referring or target medical health-care institutions can behave similarly with the referring or target physicians, and similarly can be part of a referral tree network. The two providers used as example here can refer preferentially through a network marked in bold lines, and all the target providers will allow a drop in pay for a payer every time they see a patient coming from the particular preferred provider. For example in case of the referral physician 1, for sub-specialty "w" (an example of such sub-specialty would be cardiology) the referral physician will preferentially use cardiologist "w1" in our example. The cardiologist "w1" will always be interested to have a referral basis from the referral provider 1; hence he will be enticed to accept a negotiated drop in pay (from insurance or from an uninsured or poorly insured individual) every time a patient comes from referral provider 1.

In a similar way the referral physician 2 refers for sub-specialty "y" (such as for example general surgery) preferentially to sub-specialist "y2", and similarly with the example of referral provider 1, general surgeon "y2" will accept a negotiated drop in pay (from insurance or from an uninsured or partially insured individual) if referral physician 2 will refer patients to general surgeon "y2".

If for example the two referral providers 1 and 2 respectively elect to refer in sub-specialties selected "w" and "y" respectively exclusively to sub-specialists "w1" or "y2" respectively then the negotiated drop in pay from insurance company or out-of-pocket pay from an uninsured or partially insured individual to each of the sub-specialists named will be larger than if the two providers 1 and 2 respectively will elect for example to refer only preferentially to the two sub-specialists "w1" or "y2".

On their turn the sub-specialist "w1" can elect to refer in sub-specialty "s" preferentially or exclusively to sub-specialist to sub-specialist "s2". For example, while "w1" is the preferred cardiologist for referral provider 1 the "s" sub-specialty can be a cardiac sub-specialty such as "cardiac electrophysiology", and "s2" would be the preferred electrophysiologist. Similarly, if "y2" is the preferred "general surgeon" for the referral provider 2, then the preferred sub-specialty in sub-specialty "u" for sub-specialist"y2" will be "u2". For example "u" can be a surgical sub-specialty such as "ear, nose and throat" and "u2" will the preferred "ear, nose and throat surgeon" for "general surgeon" "y2".

"S2" and "u2" respectively will accept in these two examples a lower reimbursement pay from an insurance company or an out-of-pocket pay from an uninsured patient or from a partially insured patient if the referring providers, "w1" or "y2" respectively will elect to preferentially refer patients to "s2" and "u2" respectively. The drop in insurance reimbursement or out-of-pocket pay will be larger if the referral preference will be exclusive.

Theoretically the referral network can have a multitude levels of target referral providers as indicated in FIG. 5, at least 1 or greater than 1.

If a particular referring physician chooses to refer preferentially to "n" target referral physicians or medical sources, where "n" is a numeral from 1 to infinity, the negotiated drop in pay (insurance reimbursement or out-of-pocket pay) to the referral target provider or medical source that each of the preferred target referral providers or medical sources are subjected to as a consequence of the PRN algorithm should be inversely proportional with the numeral "n". The maximum value of the drop in pay is for an "n" equal to number 1, that meaning only one preferred target provider; in this case the target provider is an exclusive target provide.

To better exemplify the structure of PRN, the PRN for referral provider 1 will start in this example with referral provider 1, then will continue for sub-specialties "w", "x", "y" and "z" with sub-specialists or medical sources "w1", "x2", "y1" and "z3" on level 1, followed on level 2 by sub-specialists or medical sources "s2", "t1", "u1" and "v3" for sub-specialties "s", "t", "u" and "v" respectively. One can imagine that for higher levels in the PRN, the number of sub-specialties can eventually be more numerous than on the lower levels.

5. The added final discount will be applying to all categories and sub-specialties of healthcare services selected identical to each category and sub-specialty or modulated by a certain factor for various categories or sub-specialties. The individual criteria discount, the added final discounts and the modulation factors are determined by an algorithm scale that the health care provider has had negotiated in advance with the central organization. The modulation factor will be applied to individual categories and sub-specialties, since the interest in various categories or sub-specialties can be different. If the interest from potential patients, companies or health insurance members is higher in a certain sub-specialty or category of services/medical or pharmaceutical items, the modulation factor will be higher as well, and if the interest is lower the modulation factor will be lower.

6. The health care provider may increase or decrease in time (on a daily, weekly, monthly or yearly basis) the individual criteria discounts, final added discounts, and modulation factors for incoming potential patients (not for those that already signed up and lock rates at time of sign up). If the potential patient did not lock his rate at the time of negotiation, then the provider can choose to modify the individual discounts, final added discounts, and modulation factors as well, based on the ratio defined below. The change in these values will depend on how many potential people (as defined in paragraph "Interested patients") that might be interested in such a negotiation are in the geographical area of interest of that particular provider, and how many people already enrolled to negotiate for that particular item or category. If the ratio (people already enrolled in same geographical area)/(potentially interested people in the geographical area of interest) is low or lagging behind, these particular values (individual discounts, final added discounts, and modulation factors) will be increased according to a scale agreed between the provider and the central organization. If the ratio is close to 1 or lower but close to it, the provider will choose to lower the values of individual discounts, final added discounts, and modulation factors. Other criteria that the medical providers or medical sources might take into account are:

a. How busy was the hospital, practice or various departments or the medical sources the year before. If very busy then prices will be higher, if not so busy they will be lower.
   b. How interested is the health care provider or medical source in the categories that the potential patients wants to apply in and in the specialties requested. Availability of manpower, time, equipment and knowledge/experience matter.
   c. The most lowest possible price that will avoid losses (such as Medicaid or Medicare contracted price), below which prices will not fall.

FIG. 6 illustrates a website page where the provider or medical source can lower the price to a negotiated price or offer a price discount using criteria that a potential patient or group of patients may access in the future.

The result of this particular negotiation process is a contract between the potential patient or medical payer and the health care provider that would allow access of the patient to the negotiated services at the price negotiated for. FIG. 7 illustrates an website page showing the negotiated prices for items negotiated by a patient called in this example "Emanuel", prices that will be part of said contract. Based on this contract the potential patient will be able to access services that he signed up for and provided by the providers he signed up with, in the future days, weeks or months or immediately during the same day of signing up. Also the potential patients can pay in a discounted manner for services that happened in a period of time immediately past to the act of signing up, for a past period of time that can be specified in the contract negotiated between provider and potential patient. The proof of this contract can be an identification number, code, card bearing such a number or code, or electronic- or computer-recognizable card that can be scanned. The contract is made available for a certain period of time (such as one year) and can be renegotiated any time prior or after expiration or renewed after the availability period is over. By invoking this contract by means of using the identification number or code or the identification card, the potential patient will benefit of the negotiated price of the health care service, medication or device to be provided or that was provided.

Here is the algorithm for negotiating out-of-pocket and other prices for medications and devices sold by pharmacies and pharmaceutical and device manufacturing companies:

1. The medical sources will offer medical products broken down in categories such as but not limited to: medications, including non-branded and branded medication (in the latter category of some importance are the orphan—very expensive—drugs), tracers (such as nuclear tracers or others), substances of contrast (such as radiology contrast substances of various types and echo contrast substances, as well as others) and new or reused devices including devices to be inserted or placed respectively in or onto one patient's body (such as artificial valves, various types of stents, pacemakers, ventricular assist devices, various prostheses, various artificial joints and joint and bone implants, and others) as well as reused or new durable medical equipment (such as sleep apnea devices, oxygen concentrators, hospital beds, wheelchairs, chairlifts, and others). All these medicine and device categories will be subdivided into specialties, such as but not limited to: internal medicine and sub-specialties, such as cardiology (heart care), gastro-enterology (care of the gut and abdominal organs), endocrinology, adolescent medicine, allergy and immunology, geriatrics (care of the elderly), hematology (blood medicine), infectious disease, nephrology (kidney medicine), oncology (cancer care), pulmonology (lung medicine), rheumatology (arthritis medicine), sports medicine, genetics and molecular biology services, psychiatry, neurology; anesthesiology; radiology; interventional radiology; radiation oncology; medical physics; nuclear medicine; pathology; transplant medicine; addiction medicine; physical medicine and rehabilitation; aerospace medicine; occupational medicine; public health and general preventive medicine; pediatrics and subspecialties such as adolescent medicine, child abuse pediatrics, developmental-behavioral pediatrics, hospice and palliative medicine, medical toxicology, neonatal-perinatal medicine, neurodevelopmental disabilities, pediatric cardiology, pediatric critical care medicine, pediatric emergency medicine, pediatric endocrinology, pediatric gastroenterology, pediatric hematology-oncology, pediatric infectious diseases, pediatric nephrology, pediatric pulmonology, pediatric rheumatology, pediatric transplant medicine, sleep medicine, sports medicines; adult hospice and palliative medicine; adult sleep medicine; surgery and surgical specialties such as general surgery, colon and rectal surgery, neurological surgery, obstetrics and gynecology, ophthalmology (eye surgery), orthopaedic surgery (bone, joint and ligament surgery), otolaryngology (ear, nose and throat), plastic surgery, vascular surgery, cardiac and thoracic surgery, urology.

Initial price tags (defined as the non-negotiated price that the medical source bills to a medical payer) are to be taken from the medical source's roster and will be attached to each item.

2. A price reduction algorithm will be initiated by an individual patient applying for himself or for a group of patients, or by a company or health insurance organization on behalf of their employees or members respectively.

3. The patient or representative of patients, or the company or health insurance organization will select the medical source he would like to negotiate with, the categories of medical devices or medicines they are interested in for each medical source and specialties he is interested in for all these categories.

4. The potential patient or the representative of the group of patients, or the company or health insurance organization will select certain criteria that will generate an individual discount (expressed in percentages, or fractions or as an absolute negotiated price) corresponding to the criterion selected, as seen in the paragraph "Patient negotiating criteria." Several criteria listed in said paragraph are: age, gender, comorbidities, income, number of potential patients in the group that the patient belongs to, productivity of items picked by the potential patient (what is the revenue that the particular categories will bring to the negotiating medical source), the number of medical sources the potential patient chooses to negotiate with, number of categories of items that the patient selects for the particular source. A last important criterion is the length of time that the potential patient selects to become a potential patient for a particular medical source and if he or she selects to lock his/her choices for the duration of this time period. If the patient will lock the rates, then the medical source might lose revenue in future, hence the rates negotiated might tend eventually to be higher in trade for a rate stability over time. If the time for which the patient chooses to lock rates is longer, similarly the rates could eventually be higher in trade for same stability over time. The power of each of these criteria result into a discount called "criteria discounts" that are additive to each other, although at times the sum of all individual discounts don't have necessarily to be equal to the "final added discount" (expressed in percentages, or fractions), but eventually have to be lower than the sum of all discounts and higher than each of the particular individual discount. For example if age greater than 60 will bring a 20% discount, income below 200% federal poverty limit 15%, while being a woman a 15% discount, the final added discount value for a 60 year old woman with an income below 200% federal poverty level can be eventually 50% or any value lower than this percentage but higher than each of the particular individual discount.

Similarly as in the case of the PRN described above, pharmacies, pharmaceutical manufacturers, as well as device retailers and manufacturers, can be part of a PRN, as defined above, in a similar manner as described above and illustrated in FIG. 5.

5. The added final discount will be applying to all categories and sub-specialties of healthcare services selected identical to each category and sub-specialty or modulated by a certain factor for various categories or sub-specialties. The individual criteria discount, the added final discounts and the modulation factors are determined by an algorithm scale that the health care provider has had negotiated in advance with the central organization. The modulation factor will be applied to individual categories and sub-specialties, since the interest in various categories or sub-specialties can be different. If the interest from potential patients, companies or health insurance members is higher in a certain sub-specialty or category the modulation factor will be higher as well, and if the interest is lower the modulation factor will be lower.

6. The medical sources eventually can increase or decrease in time (on a daily, weekly, monthly or yearly basis) the individual criteria discounts, final added discounts, and modulation factors. The change in these values will depend on how many potential patients (as defined in paragraph "Interested patients") that might be interested in such a negotiation are in the geographical area of interest of that particular source, and how many people are already enrolled to negotiate for that particular item or category. If the ratio (people already enrolled in same geographical area)/(potentially interested people in the geographical area of interest) is low or lagging behind, these particular values (individual discounts, final added discounts, and modulation factors) will be increased according to a scale agreed between the provider and the central organization. If the ratio is close to 1 or high, the provider will choose to lower the values of individual discounts, final added discounts, and modulation factors (FIG. 3).

The potential patients, or negotiating agents for groups of potential patients, members of health care insurance companies, or various company employers, can negotiate by themselves or can attach to other negotiating groups, in order to increase the overall negotiating power of the group they are part of, since the number of potential patients negotiating as a group is a factor determining the level of the price rate discount for health care services, medications or devices as shown in the paragraph "Patient negotiating criteria." Potential patients, members of health care insurance companies, or various company employers (i.e., third parties) can attach to groups that already negotiated price rates, if allowed by the health care provider or medical source said groups negotiated with. In this way potential patients, members of health care insurance companies, or employees various company employers can benefit from price rates already negotiated by said groups and can increase the negotiation power of the particular group by increasing its size.

The result of this particular negotiation process is a contract between the potential patient and the medical source that would allow access of the patient and the negotiating company employees or health insurance organization members to the negotiated medications or devices at the price negotiated for. Based on this contract the potential patient or the negotiating company employees or health insurance organization members will be able to buy medications or devices that they signed up for and provided by the sources he signed up with, in the future days, weeks or months or immediately during the same day of signing up. Also the potential patients or negotiating company employees or health insurance organization members can pay for devices or medications that were purchased in a period of time immediately past to the act of signing up, for a past period of time that can be specified in the contract negotiated between provider and potential patient. The proof of this contract can be an identification number, code, card bearing such a number or code, or electronic- or computer-recognizable card that can be scanned. The contract is made available for a certain period of time (such as one year) and can be renegotiated any time prior or after expiration or renewed after the availability period is over. By invoking this contract by means of using the identification number or code or the identification card, the potential patient will benefit of the negotiated price of the medication or medical device to be provided or that was provided.

FIG. 4 illustrates a diagram indicating the flow-process that one individual patient navigates, from negotiation of medical prices for all categories of health services, devices or medications, generation of a contract between the particular patient or the negotiating company employees or health insurance organization members and the health care provider or medical source he negotiated with, and the use of such a contract when any type of health care need arises prompting the patient to use a heath care service or buying medication or a particular medical device.

The negotiation process is facilitated by a central organization (FIG. 1). FIG. 1 illustrates an interactive automatic algorithm between interested health care providers or medical sources and potential patients with a negotiating central organization for determining reasonable negotiated out-of-pocket prices. The central organization establishes an initial algorithm approved by the medical source or health care provider that is stored and used subsequently by the two parties for conducting the price negotiation in an automatic manner, receives feeds between a first party (healthcare providers or medical sources) and a second party (potential patients or health care payers such companies or health insurance companies) and eventually facilitates the negotiation communication between the two parties, establishes a contract between the two parties that includes the initial tag prices and the negotiated prices, collects a commission as a percent margin of the difference between the initial tag price and the negotiated price as a reward for the negotiation process, stores all data regarding the negotiation process, such as initial tag price and negotiated price and contract resulting from the negotiating process, transmits the results of the negotiation process to the first and second negotiating parties or uses the data resulting from the negotiating process for offering to the potential patient or payer a real-time negotiated price at a time (such as in the future or for use in regards to services delivered or medications and devices bought in a past time) when the potential patient or payer benefits from medical services or buys medical devices or medications from the health care provider or medical source.

At the same time the central organization or a negotiating agent designated by said organization can negotiate in a similar manner health care item price rates directly with the health care providers or medical sources, based on existent data regarding the uninsured population or the population with high deductibles and high co-pays in the area, price rates that can be subsequently offered to the interested medical payers. The central organization will be rewarded as part of this negotiation process with a margin percentage (called "commission") of the discount provided. There will be factors weighing into determining how high the commission will be. First will be the percentage level of the discount provided (factor 1), with a higher percentage discount possibly for example conducing to a lower or higher percentage commission. Also other factors will intervene in determining the percentage value of the commission, including the market size (factor 2) defined by the number of potential patients in the particular geographical area (as defined in paragraph "Interested patients"), the prevalence (factor 3) of the disease treated in that particular area and the need of the particular health service, medication or device (factor 4) in that area. The central organization will be rewarded at the time of the service rendered or medication or device being sold.

If one person negotiates in name of a group of potential patients, then he can benefit of a percentage margin of the commission as defined above, that will be rewarded at the time of the service rendered or medication or device being sold.

Since the potential patient or payer negotiates in an all-including mode, meaning that all categories of services offered by a health care provider and all medications or devices manufactured or sold by a medical source are included in this algorithm, the potential patient will benefit from this fact since negotiating for all categories of services, medications or devices, assures from the get-go the fact that multiple services, medications, or devices will be used for various medical problems that the potential patient may have at the time of the negotiation or may encounter in the future, hence in total the patient will benefit from a larger discount for each item in comparison to the situation where he negotiated for a single medical item. As indicated above the larger the number of categories or sub-specialties picked by the patient with a certain provider or source the larger the discount will be from that particular provider or source for all individual categories or sub-specialties negotiated for or for individual items.

In a similar manner organizations representing groups of patients interested in potential future medical services from health care providers or buy products from medical sources can negotiate with the health care providers or medical sources. The said organizations can be medical insurance companies or employers, negotiating health care prices for their members (in case of insurance companies) or employees (in case of employers). The employers can negotiate for employees in two commonly existing cases, when the employer acts as a self-insured agent, or when the employer lets their employees to pay out-of-pocket and only negotiates health care items prices on their behalf. The potential patients or the two type of companies listed in this paragraph will be collectively labeled as "medical payers", since their common feature for the purposes of this invention is making payments for health care services, medications or medical devices.

The health insurance companies will benefit from negotiating healthcare services, drugs or devices rates of reimbursement, by being able in this way to offer lower premium policies to their members.

Each of the insurance company members will enter a list of criteria as described below, such as demographics and past medical history, that would allow the insurance company to efficiently negotiate with healthcare providers or medical sources in an automatic way as described below. The insurance company group of members will behave similarly with a group of potential patients negotiating for lower rates, and a negotiating agent (eventually nominated by the insurance company) will negotiate on their behalf, by using an average, median or mean value of the criteria entered by each member. At the same time each member can have the opportunity to attach to other negotiating groups, depending whether other groups of potential patients or payers negotiate in the area. If these said groups are larger and have a better negotiating power than the health insurance company in this particular geographical areas, it is reasonable to assume that the members can get better price rates for the services, medications or devices that the insurance company will pay for, and hence will finally obtain lower premiums for their health insurance policy. Similarly the entire health insurance member group or parts of it can attach to other negotiating groups during or after the negotiation process, in order to increase the negotiation power of the group to which they attach and of the insurance member group itself.

Similarly employers of companies can negotiate on behalf of their employees for lower pricing rates for health care services, medications or medical devices, using the system described in this invention, of negotiating with health care providers or medical sources, in case the company does not insure their employees or uses policies with high deductible or only partial coverage. The employer can eventually assign a negotiating agent to negotiate on behalf of its employees. Each of the employees will enter a list of criteria as described below, such as demographics and past medical history, that would allow the employer or the negotiating agent to efficiently negotiate with healthcare providers or medical sources in an automatic way as described below. The negotiating employees' group will behave similarly with a group of potential patients negotiating for lower rates, and a negotiating agent (eventually nominated by the insurance company) will negotiate on their behalf, by using an average, median or mean value of the criteria entered by each employee. At the same time each employee can have the opportunity to attach to other negotiating groups, depending whether other groups of potential patients or payers negotiate in the area. If these said groups are larger and have a better negotiating power than the said employees group in the particular geographical area, it is reasonable to assume that the employees can get better price rates for the services, medications or devices by attaching to these said other negotiating groups. Similarly the entire employee group of a company can attach to other negotiating groups during or after the negotiation process, in order to increase the negotiation power of the group to which they attach and of the employee group itself.

Negotiating agents can negotiate on behalf of other groups of potential patients as well, other than the groups represented by health insurance company members or employees of various company employers.

The potential patients, negotiating agents or any member of the groups that negotiating agents negotiate for, can compare head to head the various provider's or medical sources' prices, negotiated according to the criteria inputted by each potential patient or member of a negotiating health insurance group or employee group. In this way potential patients, negotiating agents or any member of the groups that negotiating agents negotiate for, can choose the best price for the best provider or medical source selected. Simultaneously the negotiating agents or potential patients further stimulate the competition between health care providers or medical sources for lower prices. A system can be imagined where the potential patients, health care insurance members and various company employees or their negotiating agents on one side as well as the health care providers and medical sources interested in negotiating health care prices or medications' and devices' price rates can visualize the initial tag prices and negotiated price rates and conduct the negotiating system in a competitive way by comparing negating price rates for same items provided by multiple and competing health care provider or medical sources according to criteria and principles described above.

The negotiation system will allow the potential patient to check the absolute negotiated price of each health care service, medication or device he or she negotiated for, prior to signing off on the contract resulting from this negotiation process and after signing as well.

The negotiation process can take place through several types of channels, including but not limited to personal negotiation, regular mail, email, telephone, web-based mechanisms, and other types of communication.

Based on this process of price negotiation, certain health care providers or medical sources may gain an advantage by pulling more patients towards them for providing medical care or for selling medication and devices respectively, in this way being able to decrease the price even more, creating a certain consolidation of the patients in the region towards particular providers or medical sources.

Another way of decreasing the health care cost to the patient is by allowing the potential patients to compare co-pay or coinsurance rates between various providers or medical sources. Co-pays and coinsurances are not negotiable and they need to be paid in full by the patients. They represent a certain percentage of the reimbursement rate negotiated by a medical provider with an insurance company (such as the 20% Medicare coinsurance for patients with no secondary insurance) in the case of coinsurance or a fixed sum attached to various categories of medical services (generally labeled as co-pays). Since the reimbursement rate can vary depending on each provider and its contracted reimbursement rates with each particular insurance the coinsurance rate can vary as well, which can be important in the case of costly procedures or services. The coinsurance rates can vary even between providers that contract with same coinsurance, since the contracted reimbursement rates can vary significantly between various providers negotiating with same private or government insurance organization.

In the case of choosing the best coinsurance or co-pay rate, the patient or potential patient establishes an "anchor" health care provider or medical source that would represent his default provider or medical source to which all the other health care provider or medical sources will be compared to. The patient will visualize a certain procedure or health care package and their attached fees. For example a certain type of procedure (such as elective cholecystectomy) called here "start procedure" will be most of the time accompanied by a surgical consultation service fee charged by a specialist, surgical procedure fee charged by a hospital or medical center, anesthesia consultation fee, anesthesia service fee provided by hospital, hospital admission fee by a hospitalist group, eventually a cardiology or internal medicine service for preoperative evaluation or cardiology and internal medicine service. All these series/procedures attached to a "start procedure" will constitute a procedure package and their summed co-pays or coinsurances can be subject to search by potential patients that will compare the co-pays/coinsurances for various centers.

One can also imagine a system that would allow a prospective insured patient to search at regular periods of time (such as annually) a comprehensive list of healthcare services/products or medical source products with their attached copays/coinsurances and an average index of said copays/coinsurance, system that would allow a prospective insured patient at regular periods of time (such as annually) to make a decision in terms of finding the most price-convenient healthcare provider or medical source.

At the time of medical service or procedure being delivered the central organization intermediating the selection of most convenient co-pay/coinsurance will charge a portion of the co-pay/coinsurance difference between the "anchor" center and the alternative providers searched by the potential patient.

The following are some objects of the invention:

A system allowing a multitude of payers (one payer being for example an individual or group of potential patients or a negotiating company or health insurance organization) to negotiate through the intermediation of a central organization health care items costs for an exhaustive all-inclusive comprehensive list of categories of health care services or medications or medical device categories with a multitude of health care providers or medical sources (defined as the retailers or manufacturers of medicines or medical devices), with a result of this negotiation being a contract, contract that can be used at any point in future time or past time after taking effect, for all health care items in the all-including exhaustive list of health care items that a particular payer (defined as potential patient or negotiating company or health insurance organization) has negotiated for. The health care provider or medical sources (such as pharmacies, pharmaceutical manufacturers or retailers and medical device retailers or manufacturers) will categorize all health services or medications and devices offered into categories depending on sub-specialty and also type of service (such as consult, visit, procedure, tests, therapy sessions, and others); the negotiating potential patients or negotiating company or negotiating health insurance organization will choose which categories they will like to negotiate for, on behalf of themselves or on behalf of other potential patients, company employees or health care insurance members respectively if such negotiating potential patients or negotiating company or negotiating health insurance organization act as negotiating agents, and initiate the interactive negotiation algorithm through the said intermediary central organization with a multitude of health care providers or medical sources for himself/herself or for a group of potential patients, using several criteria that will lead to negotiated prices for to health service, medications or medical devices, lower than initial tag prices. At the same time the central organization or a negotiating agent designated by said organization can negotiate in a similar manner health care item price rates directly with the health care providers or medical sources, based on existent data regarding the uninsured population or the population with high deductibles and high co-pays in the area, price rates that can be subsequently offered to the interested medical payers.

The potential patients or payers will chose to negotiate a comprehensive list of categories as defined in the system above, capturing all health services provided in the local area or in remote areas if services are not offered locally or quality is better remotely. Potential patients or payers can choose different or same categories from different providers or medical sources, depending on the availability, quality provided, initial tag price, distance from patient's home/work location and other criteria.

The system and method defined above where such negotiating criteria are age of potential patient; number of types of comorbidities; income of the potential patient; the number of potential patients in the group that a potential patient negotiates for or belongs to, or the number or employees a negotiating company negotiates for, or a number of members a health insurance organization negotiates for; the number of health care providers or medical sources the potential payer chooses to negotiate with in general or for each particular category of services; the number of categories of items and sub-specialties that the payer selects to negotiate with a particular provider or medical source; whether or not the potential payer would like to lock his/her negotiated prices for the future; the length of time for which the potential payer would like to lock his/her negotiated prices.

The system and method defined above where the higher the age, the higher the number of types of comorbidities, the lower the income, the higher the number of patients existing in the negotiating group, the lower the number of providers or medical sources selected by a particular patient for each category, the higher the number of categories and sub-specialties of items that the potential patient selects to negotiate with a particular provider or medical source, then the higher the price rate discount (or lower negotiated price) to a potential patient or payer will be.

The system and method defined above where if there are more severe the comorbidities or if the particular patient decide to lock his negotiated rates or locks them for a longer period of time, then the price rate discount could be lower or the negotiated price will be higher.

The method and system defined above, where potential patients or a multitude of potential patients, or the group of employees of various companies, or the group of members of an insurance company (i.e., third parties) can attach himself/herself to an already negotiating group or a group that already negotiated prices, in this way increasing the negotiating power of the group and benefiting from the negotiating power of the group. Potential patients, members of health care insurance companies, or various companies' employees (i.e., third parties) can attach to groups that already negotiated price rates, if allowed by the health care provider or medical source said groups negotiated with. In this way potential patients, members of health care insurance companies, or employees various company employers can benefit from discount rates (or negotiated price rates) already negotiated by said groups.

The system and method defined above where one criterion is the number and productivity of health care services or medications or medical devices that a patient, or employees or members of a company or a health care insurance organization respectively potentially need to have done or needs to purchase for routine care, mostly for preventative services, and that the potential payer agrees to pay in advance for at the beginning of each year or regular period time. The higher the number of such items and the higher their productivity (the cash value profit that each item brings to the health care provider or medical source), the higher the price rate discount (or lower the negotiated price) to each of all items negotiated for.

The system and method defined above where one can use a multiplicity of negotiation criteria, the discount power of each of these criteria (criteria discounts) being additive to each other resulting into an added final percentage discount; the sum of all individual discounts doesn't have necessarily to be equal to the final added discount (expressed in percentages, or fractions), but has to be lower than the sum of all discounts and higher than each of the particular individual discount.

The method and system defined above, where the final added percentage discount will be applying to all categories of healthcare services, medications or devices selected for each negotiating patient, identical to each category and sub-specialties or modulated by a certain factor (modulation factor) for various categories and sub-specialties. The percentage individual discount, the added final discounts and the modulation factors are determined by an algorithm that the health care provider has had negotiated and agreed upon in advance with the central organization.

The method and system defined above, where the health care provider or medical source may increase or decrease in time (on a daily, weekly, monthly or yearly basis) the individual criteria discounts, final added discounts, and modulation factors for incoming potential patients, company employees or health insurance members (not for those that already signed up and locked rates at time of sign up).

The method and system defined above, where if a potential patient signed up but did not lock his rate at the time of negotiation, then the provider or medical source can choose to modify the individual discounts, final added discounts, and modulation factors for these particular patients.

The method and system defined above, where the criteria discounts and added final discounts will depend on how many potential patients being interested in such a negotiation are in the geographical area of interest of that particular provider or medical source, and how many people already enrolled in negotiation; if the ratio (people already enrolled in same geographical area)/(potentially interested people in the geographical area of interest) is low or lagging behind, these particular values (individual discounts, final added discounts) will be increased according to a scale agreed between the provider and the central organization; if the ratio is close to 1, the provider will choose to lower the values of criteria discounts, or final added discounts.

The method and system defined above, where the category discount modulation factors will depend on how many potential patients might be interested in particular categories of health services or sub-specialties in the geographical area of interest of that particular provider or medical source, and how many people already signed up to negotiate for those categories or sub-specialties; if the ratio (people interested in those particular categories or sub-specialties)/(potentially interested people in the geographical area of interest) is low or lagging behind, this particular value (discount modulation factor) will be increased according to a scale agreed between the provider and the central organization; if the ratio is close to 1, the provider will choose to lower the values of modulation factors.

The negotiation system and method defined above, with a result of the negotiation process represented in this system being a contract between the potential patient, company employee or health insurance member and the health care provider or medical source that would allow access of the patient to the negotiated services at the price negotiated for, at any time during the period of time following the contract and indicated as such in the contract, or for a period time retroactive to the contract and indicated as such in the contract.

The method and system of defined above where individuals that can benefit from the discounted price are potential patients with no health care insurance, potential patients with partial insurance not covering certain health care services or products, potential patients with health care insurance traveling outside their geographical area of health care coverage, potential patients with health care insurance claims denied by the patient's covering health insurance company, potential patients with health care insurance coverage with high deductibles or high co-pay.

The system and method defined above used by health insurance companies' members to obtain negotiated reimbursement rates for health services, medications or medical devices from health care providers or medical sources, potentially lower than prices obtained by traditional negotiation, due to the fact that the system described in claim 1 has the possibility to lower price rates using criteria as listed in claim 3; obtaining lower rates will transfer into lower insurance premiums for the insurance company members.

The negotiation system and method defined above, where the communication regarding the negotiation and negotiation process itself can take place during, before, or after the negotiation process by means of a website and database, email, phone, or using a mail system.

The negotiation system and method defined above, where the potential patients, health care insurance members and various company employees or their negotiating agents on one side as well as the health care providers and medical sources interested in negotiating health care prices or medications' and devices' price rates can visualize the initial tag prices and negotiated price rates and conduct the negotiating system in a competitive way by comparing negotiated price rates for same items provided by multiple and competing health care provider or medical sources.

The system and method defined above where a referral target health care provider (health care provider, be that individual or organizations receiving consultation referrals) or referral target medical source allow a percentage discount in the payment (cash or insurance payment) for the health service provided or medication or device sold when the potential patient is to come from a referring provider (be that individual or organization) that refers all patients in the sub-specialty area of the said referral target health care provider or referral target medical source to the said referral target health care provider or referral target medical source and only "n" other referral target health care providers or medical sources, where "n" is a numeral greater than or equal to 0.

The system and method defined above, where the percentage discount provided to each potential patient referred from a particular referral health care provider to a particular referral target health care provider (index referral target health care provider) or a particular referral target medical source (index referral target medical source) is inversely proportional with numeral "n+1", where numeral "n" is the additional number of referral target health care providers or referral target medical sources in addition to the index referral target health care provider or index referral target medical source that the said referral health care provider refers patients to.

The method and system defined above, where one referring health care provider and the referral target health care provider or referral target medical source that receive patients from the particular referring health care provider from a "preferred referral network", that can be displayed on a publicly visualized platform subjected to search instruments.

The method and system defined above where the negotiation between a first party (healthcare providers or medical sources) and a second party (potential patients or health care payers such as companies or health insurance organizations) is performed through a central organization that establishes an initial algorithm approved by the medical source or health care provider that is stored and used subsequently by the two parties listed above for conducting the price negotiation in an automatic manner, a central organization that facilitates the negotiation communication between the two parties and receives feeds from both parties, collects a commission as a percent margin of the difference between the initial tag price and the negotiated price as a reward for the negotiation process, stores all data regarding the negotiation process, such as initial tag price and negotiated price and contract resulting from the negotiating process, transmits the results of the negotiation process to the first and second negotiating parties or uses the data resulting from the negotiating process for offering to the potential patient a real-time negotiated price at a time (such as in the future or for use in regards to services delivered or medications and devices bought in a past time) when the potential patient benefits from medical services or buys medical devices or medications from the health care provider or medical source.

The method and system defined above, where the individual or agency or negotiating agent listing and negotiating for other individuals or payers in the negotiating process with health care providers or medical sources and negotiating on their behalf may select to have the right to get paid a portion of the commission paid at the time of health care service being provided or medication/device being sold by said potential patients or payers to the central organization for the service of negotiating the price rates for health care services or medications/devices provided by health care providers or medical sources respectively, or select to waive this right.

A system and method to compare and choose the lowest co-pays and coinsurances in an area of interest for procedures or procedure packages:

Medical providers will list co-pays and coinsurances for all medical services under various type of health insurances Patients will select an initial center that will serve as comparison (anchor center)

Then the patient will compare the co-pays and coinsurances of other providers of interest with those offered by the anchor center The patient will select the medical center with the most convenient co-pay and coinsurance At the time of medical service being provided the central organization intermediating this algorithm receives a certain margin of profit from the difference between the co-pay or coinsurance between the "anchor center" and the center where the procedure of medical service was performed.

The method and system defined above, where a prospective insured patient to search at regular periods of time (such as annually) a comprehensive list of healthcare services/products or medical source products with their attached co-pays/coinsurances and an average index of said co-pays/coinsurance, system that would allow a prospective insured patient at regular periods of time (such as annually) to make a decision in terms of finding the most price-convenient healthcare provider or medical source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A web and computer-supported method for establishing prices for health care devices, services and medications through a process of negotiation between two parties, using two feeds of information between the first party and a second party transferred between the two parties through a computer and web system:

where the first feed of information from a first party is generated on a web and computer platform as a comprehensive list of all health services, medications, and devices offered by the first party each at an initial price rate, wherein the health services, medications, and devices are divided into categories based on specialty and type of service; and a second feed of information from the second party is generated on said internet-based platform and includes an indication of all health care services, medications, and devices on a comprehensive list for which the second party would like to negotiate the initial price rates;

followed by a third feed of information from the first party indicating how the initial price rates of the health services, medications, and devices identified by the second party is changed to negotiated price rates based on the first and second feed of information and a set of second party characteristics;

said computer and web-based method using as negotiation criteria a said set of characteristics of a second party, said characteristics inducting: age; gender; income; number of individuals represented by the second party; productivity of the health services, medications, and devices identified by the second party; whether the second party has negotiated with other providers of health services, medications, and devices in a given geographical area, and if so, how many; number of specialties identified by second party; number of types of services identified by the second party; specialties and types of services the second party does not negotiate with the other party; number and productivity of health services, medications, and devices needed by the second party; geographical location of the second party; and whether the second party locks in the negotiated price rates, and if so, the length of time the second party desires to lock in the negotiated price rates;

and said computer and web-based method generating a contract for a comprehensive list of health services, medications, and devices to be entered into by the first party and the second party, such contract being based on criteria included in the first feed of information offered by the first party and the second feed of information offered by the second party, contract under which the first party makes available over a period of time to the second party at the negotiated price rates the health services, medications, and devices identified by the second party.

2. The computer and web-based method of claim 1, wherein the first party comprises one or more healthcare providers or medical sources.

3. The computer and web-based method of claim 1, wherein the second party comprises one or more potential patients seeking to receive one or more health services, medications, or devices offered by the first party, or one or more healthcare insurance members, or companies representing such potential patients or insurance members.

4. The computer and web-based method of claim 1 further comprising: collecting a commission proportional to the difference between the initial price rates and the negotiated price rates and transmitting the negotiated price rates to the first party and the second party.

5. The computer and web-based method of claim 1 further comprising offering the negotiated price rates for the health services, medications, and devices identified by the second party to an entity other than the second party.

6. The computer and web-based method of claim 1, wherein the difference between the negotiated price rates and the initial price rates increases as: age of individuals in second party increases; number of individuals represented by the second party increases; when the first party comprises one or more healthcare providers or medical sources, the number of healthcare providers and medical sources represented by the first party decreases; number of specialties and types of services identified by the second party increases; or the number and productivity of health services, medications, and devices needed by the second party increases.

7. The computer and web-based method of claim 1, wherein the difference between the negotiated price rates and the initial price rates decreases if: the second party locks in the negotiated price rates; or as the length of time for which the second party desires to lock in the negotiated price rates increases.

8. The computer and web-based method of claim 1, further comprising: the first and second party receiving from a third party a third feed of information including an identification of all health services, medications, and devices on the list for which the third party would like to negotiate initial price rates, said feed also including third party characteristics; age; gender; income; number of individuals represented by the third party; productivity of the health services, medications, and devices identified by the third party; whether the party has negotiated with other providers of health services, medications, and devices in a given geographical area, and if so, how many; number of specialties identified by third party; number of types of services identified by the third party; specialties and types of service the third party does not negotiate with the other party; number and productivity of health services, medications, and devices needed by the third party; geographical location of the third party; and whether the third party locks in the negotiated price rates, and if so, the length of time the third party desires to lock in the negotiated price rates; receiving from the third party a third feed of information; and changing the negotiated price rates based on the third feed of information.

9. The computer and web-based method of claim 8, wherein the third party comprises one or more potential patients seeking to receive one or more health services, medications, or devices offered by the first party, or one or more healthcare insurance members, or companies representing such potential patients or health insurance members, wherein the one or more potential patients or health insurance members are not represented by the second party.

10. The computer and web-based method of claim 8, further comprising generating a contract to be entered into by the first party, the second party, and the third party, under which the first party makes available over a period of time to the second party and the third party at the negotiated price rates the health services, medications, and devices identified by the second party and the third party.

11. The computer and web-based method of claim 1, further comprising adjusting the negotiated price rates over time.

12. The computer and web-based method of claim 1, further comprising adjusting the negotiated price rates based on the ratio of the number of potential patients represented by the second party in a geographical area and the number of potential patients in said given geographical area not represented by the second party.

* * * * *